United States Patent
Motojima

(12)
(10) Patent No.: US 6,258,422 B1
(45) Date of Patent: Jul. 10, 2001

(54) MOLDING METHOD FOR THERMOSETTING RESIN BASED, RUBBER VULCANIZATION TYPE, FIBER REINFORCED COMPOSITE MATERIAL, AND THERMOSETTING RESIN, BASED, RUBBER VULCANIZATION TYPE, FIBER REINFORCED COMPOSITE MATERIAL

(75) Inventor: Shinji Motojima, Kanagawa (JP)

(73) Assignee: Tokyo R&D Co., Ltd., Tokyo (JP)

( * ) Notice: Subject to any disclaimer, the term of this patent is extended or adjusted under 35 U.S.C. 154(b) by 0 days.

(21) Appl. No.: 09/336,277

(22) Filed: Jun. 18, 1999

(51) Int. Cl.$^7$ ..................................................... B29D 22/00
(52) U.S. Cl. .......................... 428/36.4; 264/257; 428/36.8
(58) Field of Search ..................................... 428/413, 521, 428/522, 36.4, 36.8; 264/248, 257

(56) References Cited

FOREIGN PATENT DOCUMENTS

05301972 * 11/1993 (JP) .
5-301972   11/1993 (JP) .

* cited by examiner

*Primary Examiner*—Robert Dawson
*Assistant Examiner*—D. Aylward
(74) *Attorney, Agent, or Firm*—Dellett and Walters

(57) ABSTRACT

A thermosetting resin based, rubber vulcanization type, fiber reinforced composite material characterized in that, in a thermosetting step of a molding of said fiber reinforced composite material, a rubber material is simultaneously vulcanized integrally with said thermosetting resin, in order to impart improved qualities, such as chemical resistance, oil resistance, a quality of being airtight or waterproof, sealing properties, a capacity for electrical insulation and a capacity to dampen vibrations, to said composite material.

4 Claims, 2 Drawing Sheets

MOLDING METHOD FOR THERMOSETTING RESIN BASED, RUBBER VULCANIZATION TYPE, FIBER REINFORCED COMPOSITE MATERIAL, AND THERMOSETTING RESIN, BASED, RUBBER VULCANIZATION TYPE, FIBER REINFORCED COMPOSITE MATERIAL

BACKGROUND OF THE INVENTION

This invention relates to the field of fiber reinforced composite materials produced by molding a thermosetting resin, such as an epoxy resin or polyester resin, which is reinforced with fibers, such as carbon fibers, aramid fibers (Kevlar), glass fibers, and others, and also to rubber vulcanization type, fiber reinforced composite materials, in which a rubber material is vulcanized to improve certain properties of such materials.

One object of the present invention is to provide a thermosetting resin based, fiber reinforced composite material which retains important characteristics found in such fiber reinforced composite materials, such as light weight, high strength and high rigidity, but which also has improved qualities not available at a satisfactory level in such conventional materials: chemical resistance, oil resistance, being airtight or waterproof, certain sealing properties, electrical insulating properties, vibration damping properties, etc. With such improved functions, materials according to the present invention can thereby overcome disadvantages associated with conventional fiber reinforced composite materials, such as restrictions on use, the structural shortcomings of the various products to which fiber reinforced composite materials are applied, being uneconomical, and so on.

A further object of the present invention is to provide a thermosetting resin-based, rubber vulcanization type, fiber reinforced composite material in which a rubber material is vulcanized in the thermosetting step of the molding stage for the thermosetting resin, in order to impart the various improved functions described above to the resulting composite material.

Conventionally, fiber reinforced composite materials, produced by reinforcing a thermosetting resin with fibers, have excellent characteristics, such as being light in weight, high in strength and high in rigidity, and thus are currently widely used as aircraft and automobile parts and materials.

However, since a fiber reinforced composite material is insufficiently strong in connection with concentrated loads and is inferior in its capacity to dampen vibrations, a separate reinforcing member is additionally provided in the composite material, for example, where such a concentrated load is applied. In the case of material subject to vibrations, conventionally, special measures are required to prevent the transmission of such vibrations, by using, for example, a vibration insulator 6 as shown in FIG. 1B. In FIG. 1, the fiber reinforced composite material is indicated at 1.

In the case of fiber reinforced composite materials using carbon fibers, the carbon fibers are good electrical conductors and, therefore, it may become necessary to take special precautions when such materials are used with electric wiring or used as electrical insulation, in order to prevent electrical leakage. For example, where a container 8 for an electric board 7 is formed using a carbon fiber reinforced composite material as shown in FIG. 2B, an insulating plate 9 interposed between the bottom of the container 8 and the electric board 7 is required.

Also, conventional fiber reinforced composite materials are inferior with regard to other qualities, such as chemical resistance, oil resistance, and being airtight or waterproof, and certain sealing properties.

Accordingly, for products requiring such functions, special measures must be taken. For example, as shown in FIG. 3B, a separate sealant 12 must be affixed to the sliding portion of a fiber reinforced composite material 11 where a member 10, such as a pipe, is inserted.

OUTLINE OF THE INVENTION

The present invention provides a thermosetting resin based, rubber vulcanization type, fiber reinforced composite material using a thermosetting resin, such as epoxy resin or polyester resin, reinforced with fibers, such as carbon fibers, aramid fibers or glass fibers. In the thermosetting step of the molding stage for the thermosetting resin, a rubber material is integrally vulcanized with the thermosetting resin during the molding of the fiber reinforced composite material. This is done in order to add improved qualities to the resulting material, such as chemical resistance, oil resistance, being airtight or waterproof, certain sealing properties and the capacity for electrical insulation and the capacity to dampen vibrations.

Sheet materials composed of a thermosetting resin reinforced with carbon fibers, such as aramid or glass fibers, are molded, and, prior to the thermosetting of the sheet materials, an unvulcanized nitrile rubber sheet is molded together with the sheet materials into the desired shape. Thereafter, the sheet materials and rubber sheet, combined in the molding step, are heated together to approximately 150° C., thereby simultaneously accomplishing the setting step for the thermosetting resin and the vulcanizing step for the rubber material.

The thermosetting resin based, rubber vulcanization type, fiber reinforced composite material according to the present invention retains the beneficial characteristics of fiber reinforced composite materials, such as being light in weight, high in strength and high in rigidity, but adds or improves the qualities described above. Thus, the fiber reinforced composite material according to the present invention has wide applications and uses. This is because the advantageous of conventional materials are retained in the present invention, but various disadvantages associated such conventional fiber reinforced composite materials can be reduced or eliminated.

EMBODIMENTS

A thermosetting resin based, rubber vulcanization type, fiber reinforced composite material according to the present invention is produced using a fiber reinforced composite material, in which a thermosetting resin, such as epoxy resin or polyester resin, is reinforced with fibers, such as carbon fibers, aramid fibers or glass fibers. According to the present invention, a rubber material is vulcanized integrally with such thermosetting in the thermosetting step of the molding stage of the conventional production process, in order to impart improved qualities, such as chemical resistance, oil resistance, being airtight or waterproof, certain sealing properties, the capacity for electrical insulation and the capacity to dampen vibrations, to the resulting material.

Figure 4A:
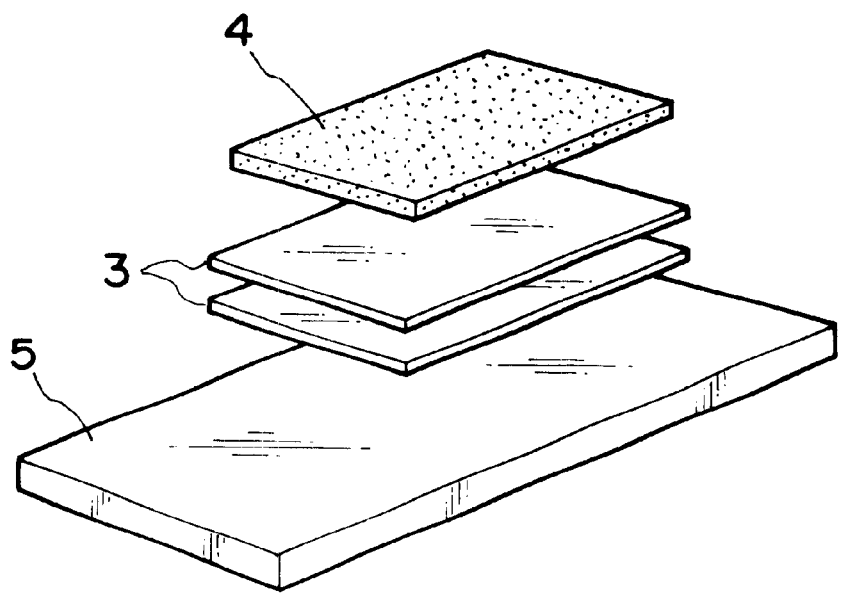
FIG. 4A is a perspective view illustrating a rubber vulcanizing process according to the present invention.
Figure 4B:
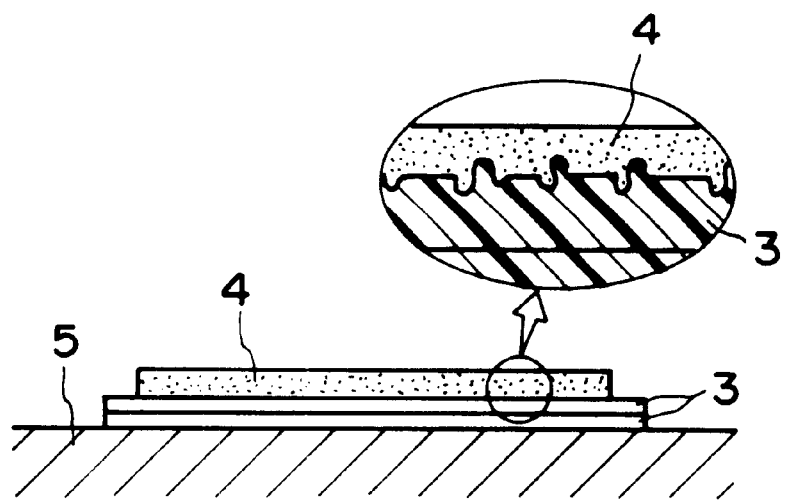
FIG. 4B shows a vulcanized state, as well as a portion of the affixed vulcanized rubber, in an enlarged view.

The rubber material is vulcanized integrally with the thermosetting resin as described below. As shown in FIGS. 4A and 4B, by way of example, sheet materials 3, (prepreg sheets), each produced by mixing a thermosetting resin with carbon fibers, aramid fibers or glass fibers, are molded using a mold 5, and prior to the thermosetting of the sheet materials, an unvulcanized nitrile rubber sheet 4 is molded together with the sheet materials into the desired shape by using the same mold 5. Subsequently, the sheet materials and the rubber sheet, combined in the molding step, are heated together to approximately 150° C., for example, thereby simultaneously accomplishing the setting step for the thermosetting resin and the vulcanizing step for the rubber material.

As a result, at the interface between the two types of materials, (between sheets 3 and 4), the resin and the rubber are appropriately combined and integrally bonded together in an interlocking fashion, as shown in the enlarged view of FIG. 4B. The sheets 3 and 4 are set and vulcanized, respectively, without any deterioration of the primary functions of either sheet. Consequently, the rubber vulcanization type, fiber reinforced composite material obtained in this manner retains the advantageous functions of both materials used, and thus is a multifunctional material having wide practical applications.

Figure 1A:
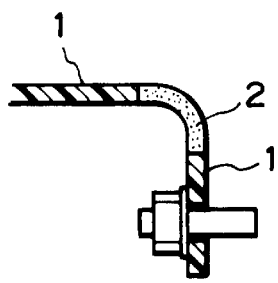
FIG. 1A shows an example of an application of a rubber vulcanization type, fiber reinforced composite material according to the present invention.
Figure 1B:
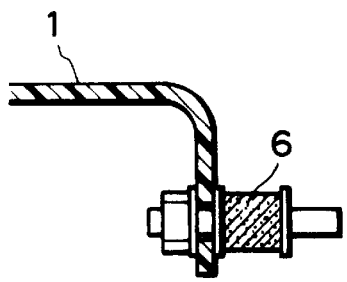
FIG. 1B shows a conventional application using a vibration insulator.

In the embodiment as shown in FIG. 1A, for example, the rubber vulcanization type, fiber reinforced composite material 2 has vulcanized rubber integrally formed at the area subject to vibrations. Since the rubber vulcanization type, fiber reinforced composite material 2 has a vibration damping function, the labor and cost required relating to the conventional addition of a vibration-reducing rubber material 6 (FIG. 1B) can be eliminated, thus making it possible to simplify materials and work.

Figure 2A:
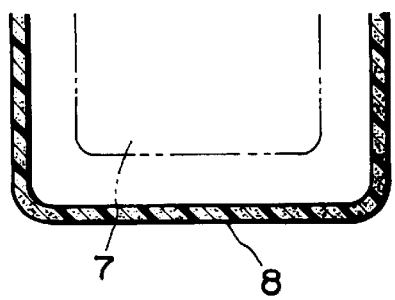
FIG. 2A shows another example of an application of a rubber vulcanization type, fiber reinforced composite material according to the present invention.
Figure 2B:
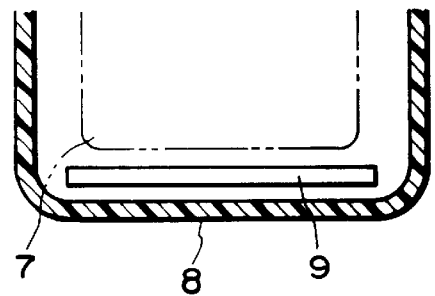
FIG. 2B shows a conventional application using an insulating plate.

In the embodiment as shown in FIG. 2A, a part 8 used for holding an electric board 7 is formed using the rubber vulcanization type, fiber reinforced composite material so that the vulcanized rubber portion forms the inner surface of the container. Because of the electrical insulating function of the rubber vulcanization type, fiber reinforced composite material 8, it is unnecessary to use the insulating plate 9 (FIG. 2B) typical in the conventional method, thus eliminating the labor and cost required for provision of such insulating plate 9.

Figure 3A:
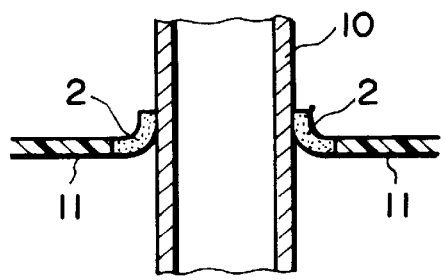
FIG. 3A shows still another example of an application of a rubber vulcanization type, fiber reinforced composite material according to the present invention.
Figure 3B:
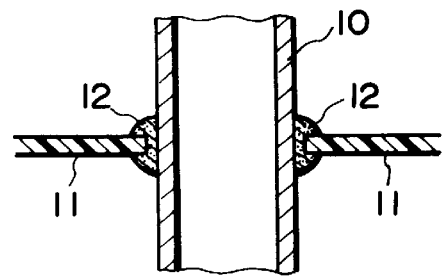
FIG. 3B shows a conventional application using a sealant.

In the embodiment as shown in FIG. 3A, the vulcanized rubber is formed on the rubber vulcanization type, fiber reinforced composite material where a member 10, such as a pipe, is inserted. Since the rubber vulcanization type, fiber reinforced composite material 2 can be firmly sealed, and is airtight and waterproof, the labor and cost required for additional provision of a sealant 12 (FIG. 3B) can be eliminated.

The rubber vulcanization type, fiber reinforced composite materials 2 and 8 according to the present invention can, of course, be used in a conventional manner as aircraft and automobile parts and materials. However, in such applications the present invention can effectively provide additional beneficial characteristics, such as chemical resistance, oil resistance, being airtight and waterproof, certain sealing properties, the capacity for electrical insulation and the capacity to dampen vibrations.

What is claimed is:

1. In a method to make a fiber reinforced composite material obtained by molding a thermosetting resin, such as epoxy resin or polyester resin, reinforced with fibers, such as carbon, aramid or glass fibers, a method to make a thermosetting resin based, rubber vulcanization type, fiber reinforced composite material comprising the steps of:

molding sheet materials composed of said thermosetting resin together with an unvulcanized nitrile rubber sheet into a desired shape; and heating together said sheet materials and said rubber sheet, molded into said desired shape, to approximately 150° C., thereby simultaneously accomplishing a setting treatment for said thermosetting resin and a vulcanization treatment for said rubber material, and integrally bonding said sheet material and said rubber sheet together in an interlocking fashion.

2. A thermosetting resin based, rubber vulcanization type fiber reinforced composite material characterized in that, said fiber reinforced composite material is adapted to be subject to vibrations and has vulcanized rubber integrally formed at a portion thereof, formed by using the method according to claim 1.

3. A thermosetting resin based, rubber vulcanization type fiber reinforced composite material characterized in that, said fiber reinforced composite material comprises a container used for holding an electrical board and is coated on an inner surface thereof with vulcanized rubber, formed by using the method according to claim 1.

4. A thermosetting resin based, rubber vulcanization type fiber reinforced composite material characterized in that, said fiber reinforced composite material has a hole or a groove defined therein where a member such as a pipe, is inserted, and edges of said hole or groove are coated with vulcanized rubber, formed by using the method according to claim 1.

* * * * *